United States Patent [19]

Hirata et al.

[11] Patent Number: 5,107,340
[45] Date of Patent: Apr. 21, 1992

[54] DIGITAL VIDEO SIGNAL NOISE-REDUCTION APPARATUS WITH HIGH PASS AND LOW PASS FILTER

[75] Inventors: Toru Hirata, Yokohama; Masahiro Yamada, Kawasaki; Seijiro Yasuki, Yokohama; Kiyoyuki Kawai, Yokosuka, all of Japan

[73] Assignee: Kabushiki Kaisha Toshiba, Kawasaki, Japan

[21] Appl. No.: 628,988

[22] Filed: Dec. 17, 1990

Related U.S. Application Data

[63] Continuation of Ser. No. 326,785, Mar. 21, 1989, abandoned.

[30] Foreign Application Priority Data

Mar. 30, 1988 [JP] Japan .................................. 63-76901

[51] Int. Cl.$^5$ ............................................... H04N 5/21
[52] U.S. Cl. ....................................... 358/36; 358/167
[58] Field of Search ...................... 358/36, 167, 31, 39, 358/40

[56] References Cited

U.S. PATENT DOCUMENTS

| | | | |
|---|---|---|---|
| 4,737,850 | 4/1988 | Lu et al. | 358/167 |
| 4,794,454 | 12/1988 | Sugiyama et al. | 358/105 |
| 4,796,088 | 1/1989 | Nishimura et al. | 358/167 |
| 4,807,034 | 2/1989 | Takeuchi et al. | 358/105 X |
| 4,870,482 | 9/1989 | Yasuki et al. | 358/36 X |
| 4,961,113 | 10/1990 | Okada | 358/167 |

FOREIGN PATENT DOCUMENTS 3617827 12/1987 Fed. Rep. of Germany .
62-22310 5/1987 Japan .

Primary Examiner—James J. Groody
Assistant Examiner—Mark R. Powell
Attorney, Agent, or Firm—Cushman, Darby & Cushman

[57] ABSTRACT

A noise-reduction apparatus is disclosed which reduces noise contained in a digital video signal. A two-frame difference detecting unit receives the digital video signal and detects a two-frame difference signal. A high-frequency component extracting unit extracts a high-frequency component of the digital video signal or a high-frequency component of the two-frame difference signal. A first elimination signal generating unit generates a first elimination signal corresponding to the two-frame difference signal. A frame difference detecting unit received the digital video signal and detects a frame difference signal. A low-frequency component extracting unit extracts a low-frequency component of the digital video signal or a low-frequency component of the frame difference signal. A second elimination signal generating unit generates a second elimination signal corresponding to the frame difference signal. A noise elimination unit eliminates the noise from the digital video signal in accordance with the first and second elimination signals.

16 Claims, 4 Drawing Sheets

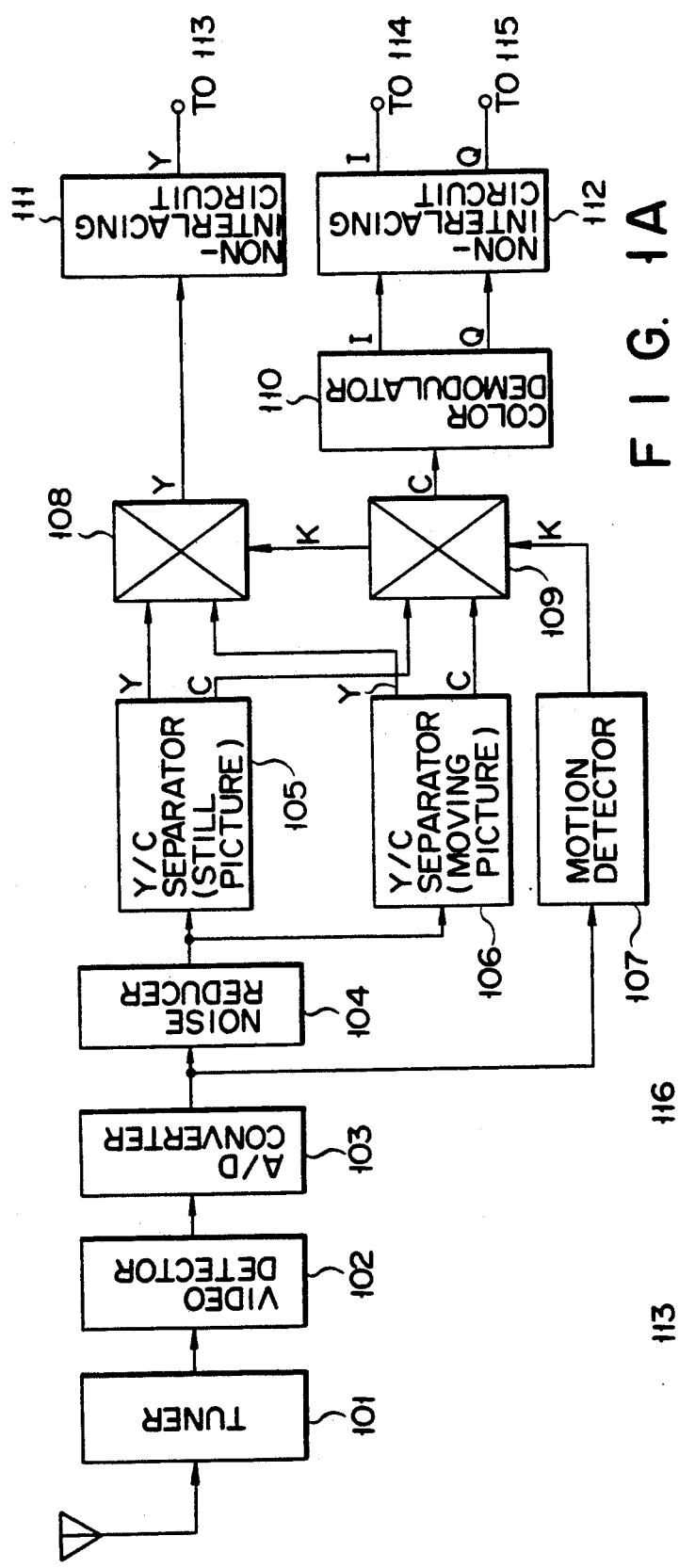
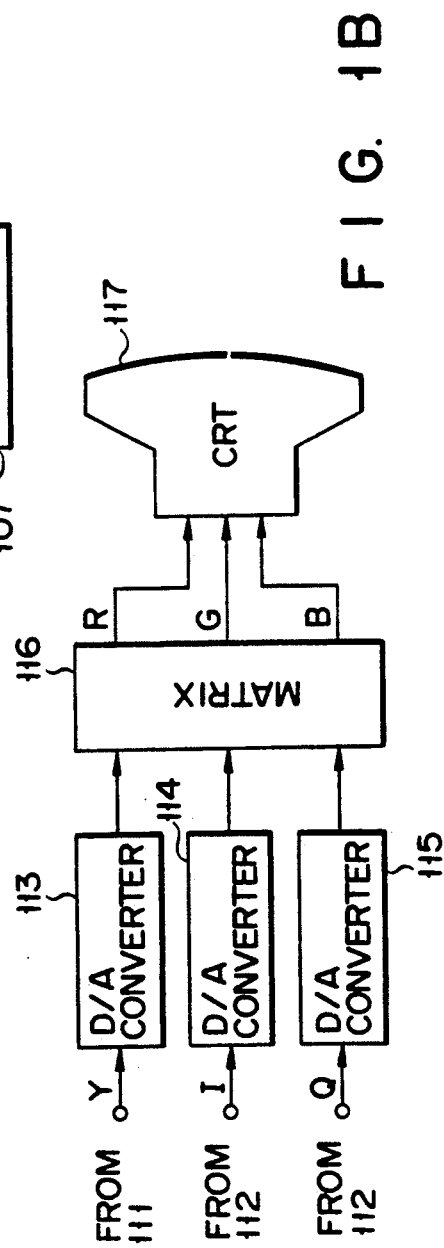
FIG. 1A
FIG. 1B

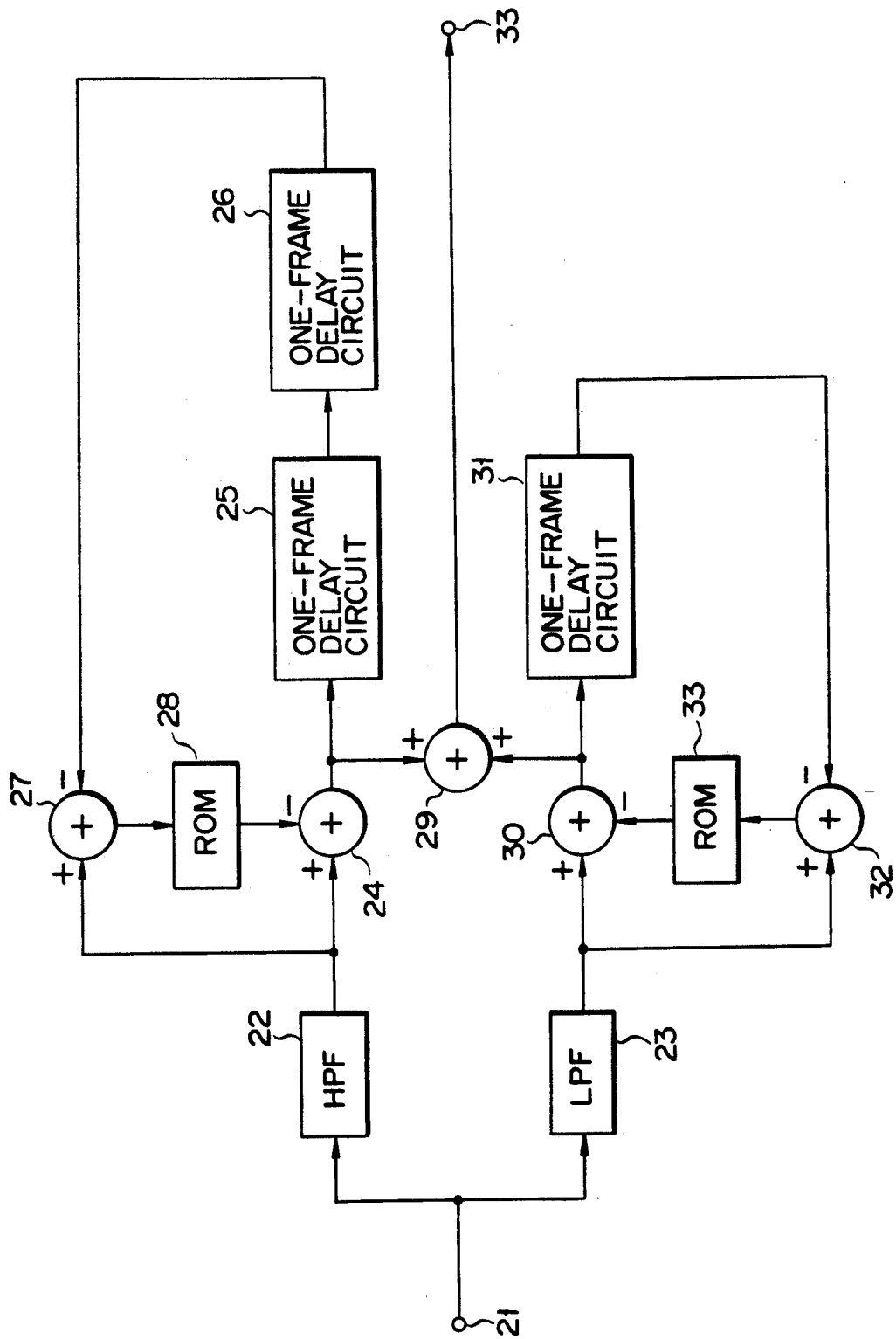
F I G. 2

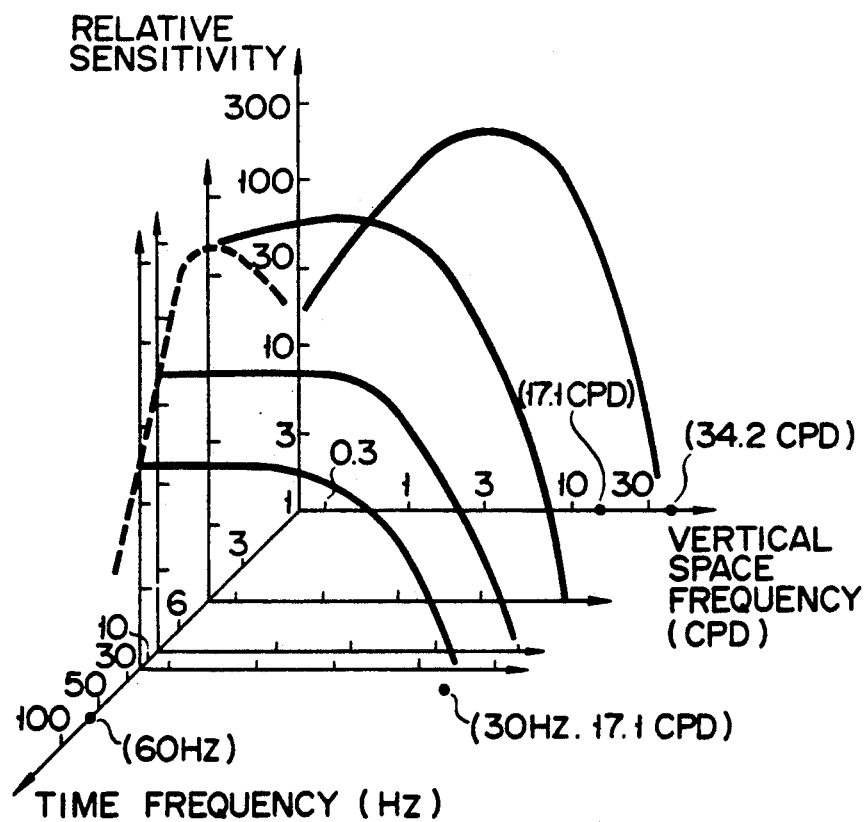
F I G. 3
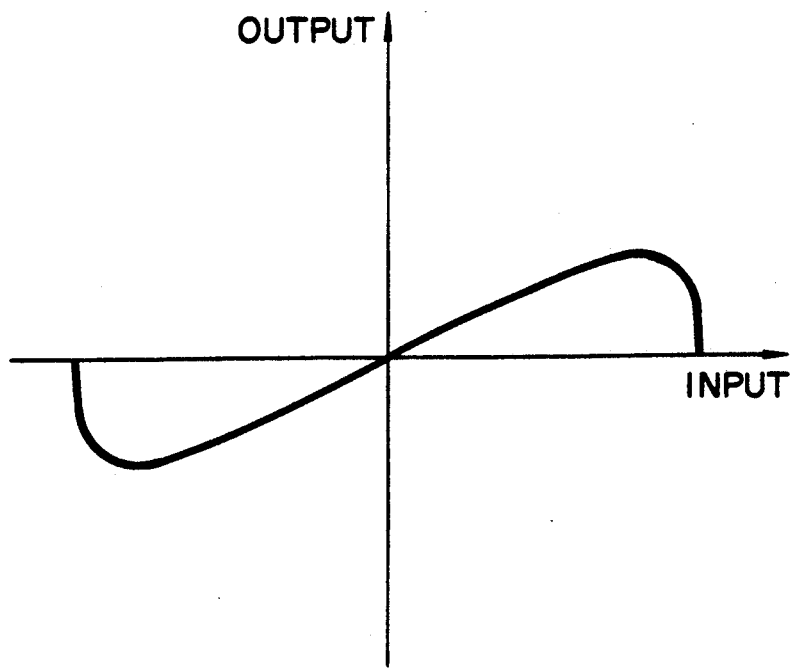
F I G. 4

DIGITAL VIDEO SIGNAL NOISE-REDUCTION APPARATUS WITH HIGH PASS AND LOW PASS FILTER

This is a continuation of application Ser. No. 07/326,785, filed on Mar. 21, 1989, which was abandoned upon the filing hereof.

BACKGROUND OF THE INVENTION

1. Field of the Invention

The present invention relates to a noise-reduction apparatus and, in particular, to a noise-reduction apparatus for reducing noise signals of a digital video signal by separating the digital video signal into high- and low-frequency components.

2. Description of the Related Art

In recent years, in order to improve picture quality, the digital signal processing technique has been applied to conventional video signal processing apparatuses such as a television receiver. Improvement of picture quality can be achieved by, for example, a noise reduction technique utilizing the following property inherent to picture images:

A digital video signal which is used, for example, in a color television system has a strong interframe correlation with regard to respective pixels of a still picture. On the other hand, digital video signal noise is often generated only in the case of some frames, and in random fashion, revealing almost no interframe correlation. Accordingly, by subjecting the interframe digital video signals to a subtraction operation, noise signals contained therein can be removed.

The conventional noise reduction apparatus utilizing the aforementioned interframe correlation property employs a chroma inverter. Specifically, an input digital video signal is supplied to a one frame delay circuit where it is delayed by one frame. Since, in general, a color (C) signal of a digital video signal has a property wherein its phase is inverted between frames, the in-phase state is achieved by inverting the phase of the (C) signal alone after the one-frame-delayed video signal has been separated by a Y/C separator into a brightness (Y) signal and color (C) signal. An addition circuit then subtracts the one-frame-delayed and phase-corrected output from an output video signal, to obtain a difference signal between the frames, and a noise signal is removed based on the interframe difference signal.

However, the conventional noise reduction apparatus cannot achieve full separation of the digital video signal into a brightness (Y) component and color (C) component, with the result that its noise-reduction capability is reduced due to a brightness signal being contained in the color signal obtained.

SUMMARY OF THE INVENTION

The object of the present invention is to provide a digital video signal noise-reduction apparatus which can achieve a color signal in-phase state without the need to effect a Y/C separation.

Another object of the present invention is to provide a digital video signal noise-reduction apparatus with improved noise-reduction capability.

According to the present invention, there is provided a noise-reduction apparatus for reducing noise in a digital video signal having a high-frequency component and a low-frequency component, the apparatus comprising:

two-frame difference detecting means for receiving the digital video signal and for detecting a two-frame difference signal representing a difference between a signal and a two-frame delayed signal;

high-frequency component extracting means connected to extract one of the high-frequency component of the digital video signal and a high-frequency component of the two-frame difference signal detected by the two-frame difference detecting means;

first elimination signal generating means for generating a first elimination signal corresponding to the two-frame difference signal detected by the two-frame difference detecting means;

frame difference detecting means for receiving the digital video signal and for detecting a frame difference signal representing a difference between a signal and a one-frame delayed signal;

low-frequency component extracting means connected to extract one of the low-frequency component of the digital video signal and a low-frequency component of the frame difference signal detected by the frame difference detecting means;

second elimination signal generating means for generating a second elimination signal corresponding to the frame difference signal detected by the frame difference detecting means; and noise eliminating means for eliminating the noise from the digital video signal, in accordance with the first elimination signal generated by the first elimination signal generating means and the second elimination signal generated by the second elimination signal generating means.

BRIEF DESCRIPTION OF THE DRAWINGS

The foregoing aspects and other features of the invention will be explained below in the following description in connection with the accompanying drawings in which:

FIGS. 1A and 1B are a block diagram schematically showing a digital color television receiver which incorporates a noise-reduction apparatus according to the present invention;

FIG. 2 is a circuit arrangement showing a noise-reduction apparatus according to one embodiment of the present invention;

FIG. 3 is a view showing a time/space frequency characteristic for explaining the noise elimination capability of the noise-reduction apparatus;

FIG. 4 is an input/output characteristic diagram for explaining the operation of the circuit of FIG. 2.

DETAILED DESCRIPTION OF THE PREFERRED EMBODIMENTS

Figure 5:
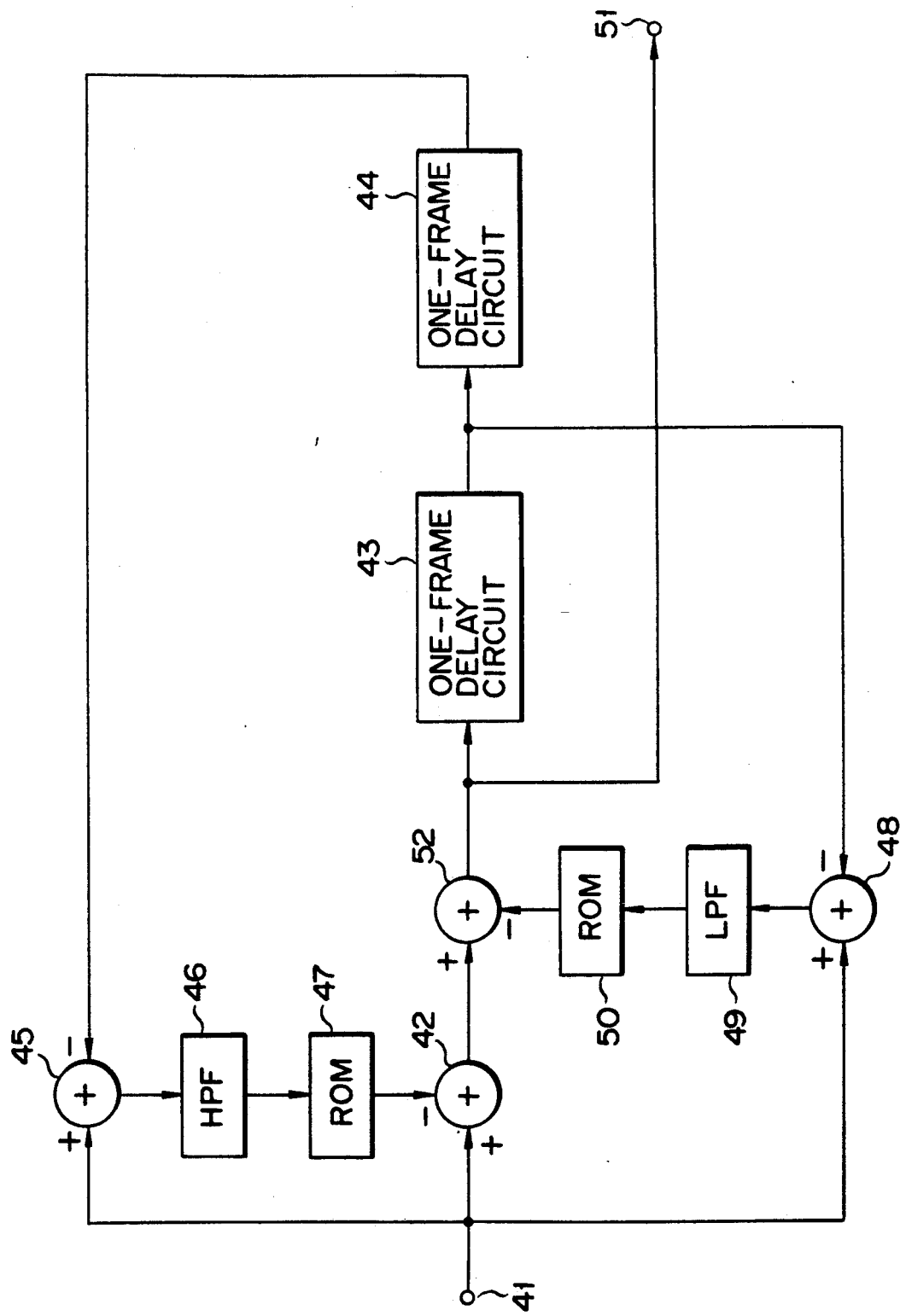
FIG. 5 is a circuit diagram showing a noise-reduction apparatus according to a second embodiment of the present invention.

The outline of a digital color television receiver to which the present invention is applied will be explained below in more detail with reference to FIGS. 1A and 1B.

As shown in FIGS. 1A and 1B, a signal of a channel to be received is selected by a tuner 101 from a high frequency signal, that is, an NTSC composite analog video signal induced at an antenna terminal of a TV receiver. The selected high frequency signal is converted to an intermediate frequency signal and the intermediate frequency signal from the tuner 101 is supplied to a video detector 102 where a color video signal is taken out. The color video signal is supplied to an A/D converter 103 where it is sampled by a 4 fsc (fsc: a color subcarrier frequency) clock signal synchronizing with a burst signal and converted to, for example, a 8-bit 14.3 MHz digital video signal. The digital video signal is supplied to a noise-reduction apparatus (noise reducer) 104 of the present invention and to a motion detector 107.

The noise-reduction apparatus of the present invention eliminates a noise signal from the digital video signal. The noise-eliminated digital video signal is supplied to a Y/C separator 105 for still picture processing and to a Y/C separator 106 for moving picture processing. At the Y/C separator 105, the Y/C separation of a digital video signal is effected by a time-base computation, that is, an interframe computation, through the utilization of a strong correlation between the frames for the still picture. At the Y/C separator 106, on the other hand, the Y/C separation of the digital video signal is carried out by a vertical computation, that is, an interline computation, through the utilization of a strong correlation between the lines for the moving picture. Of those Y and C signals thus obtained from the Y/C separators 105 and 106, the corresponding Y signals are mixed by a mixer 108 with each other in accordance with a movement coefficient K determined by a motion of a picture which is detected at the motion detector 107. Similarly, the corresponding C signals are mixed by a mixer 109 with each other in accordance with a movement coefficient K determined by the motion of the picture which is detected at the motion detector 109. The Y signal of the mixer 108 is supplied to a non-interlacing circuit 111 where a Y interpolation signal is generated. The Y signal and Y interpolation signal are written into a line memory. The Y signal and interpolation signal are alternately read out at double the write-in speed to perform a time compression. By so doing, the Y signal input mode is changed from the interlace scanning to the non-interlace scanning and, at the same time, the horizontal frequency is doubled to 31.468 KHz.

The C signal of the mixer 109 is supplied to a color demodulator 110 where it is demodulated. The color demodulator delivers two color difference signals I and Q. The two color difference signals are supplied to a non-interlacing circuit 112 where a C interpolation signal is generated. The input C signal and C interpolation signal are written into a line memory. The C signal and interpolation signal are alternately read out at double the write-in time to perform a time compression. The C signal input mode is changed from the interlace scanning to the non-interlace scanning and, at the same time, the horizontal frequency is doubled to 31.468 KHz.

The Y signal of the non-interlacing circuit 111 is supplied to a D/A converter 113 and the I and Q signals of the non-interlacing circuit 112 are supplied to D/A converters 114 and 115, respectively. The Y, I and Q signals are converted to corresponding analog signals. The analog equivalents of the Y, I and Q signals are supplied to a matrix 116 where they are converted to the three primary color signals R, G and B. The color CRT is supplied with the signals R, G and B to allow a color image to be displayed on a viewing screen.

FIG. 2 is a circuit arrangement of a noise-reduction apparatus according to one embodiment of the present invention.

The digital video signal, which is supplied from A/D converter 103, is delivered to a high-pass filter (HPF) 22 and low-pass filter (LPF) 23 via an input terminal 21. HPF 22 extracts a high-frequency component from the digital video signal, which contains a color signal and high-frequency component YH of the brightness signal Y. On the other hand, LPH 23 extracts a low-frequency component from the digital video signal, which contains a low-frequency component YL of the chrominance signal Y.

The high-frequency component of the HPF 22 is supplied to one-frame delay circuit 25 via adder circuit 24 and to a one-frame delay circuit 26 in series with the one-frame delay circuit 25 to allow the high-frequency component signal to be two-frame delayed. The two-frame delayed high-frequency component signal is fed to an adder 27 serving as an interframe difference detector. At the adder circuit 27, the so-delayed output level is subtracted from the high-frequency component of the HPF 22 to obtain an interframe difference signal of the high-frequency component. Since the color signal C has a property wherein its phase is inverted between the frames, the C signal is brought into an in-phase mode after being two-frame delayed. Therefore, the adder circuit 27 performs a subtractive processing with the color signal C in an in-phase state. It is, therefore, possible to obtain a two-frame difference signal, from the adder circuit 27, which contains a high-frequency noise signal.

The two-frame difference signal is supplied to a read only memory (ROM) 28, which is constructed of a non-linear circuit having an input/output characteristic as shown in FIG. 4.

This characteristic enables the ROM 28 to generate a noise-eliminating signal corresponding to the two-frame difference signal. The noise-eliminating signal is supplied to an adder 24 where it is subtracted from the high-frequency component coming from the HPF 22 to generate a high-frequency component without the noise signal. The high-frequency component is supplied to adder 29 as will be set out below.

A low-frequency component extracted by the LPF 23 is fed via an adder 30 to a one-frame delay circuit 31 to achieve a one-frame delay. The one-frame delayed low-frequency component is supplied to an adder 32 as a frame difference detector. The adder 32 subtracts that delayed component from the low-frequency component coming from the LPF 23 to produce an interframe difference signal of a low-frequency component. Since the aforementioned low-frequency component contains no color signal C, an in-phase condition does not need to be achieved with a two-frame delay given. The one-frame difference signal is supplied to a ROM 33 which, in order to eliminate a noise signal contained in the low-frequency component, produces a noise-eliminating signal corresponding to the one-frame difference signal. The ROM 33 is constructed of a non-linear circuit having an input/output characteristic as shown in FIG. 4. The noise-eliminating signal is supplied to an adder 30 where it is subtracted from the low-frequency component coming from the LPF 23 to produce a low-frequency component without the noise signal. The low-frequency component is supplied to the adder 29. At the adder 29, the noise-eliminated high-frequency component coming from the adder 24 and noise-eliminated low-frequency component coming from the adder 30 are additively combined with each other to produce a noise-eliminated video signal. The noise-eliminated video signal is delivered to an output terminal 33.

As already set forth above in more detail, in the embodiment of the present invention, an input digital video signal is separated into high- and low-frequency components. Since there is almost no interframe correlation regarding the noise signal, a noise signal is eliminated by achieving a two-frame difference processing in the case of the high-pass component. As in the case of the low-pass component, a noise signal is eliminated by performing a one-frame difference processing in view of the fact that there is almost no interframe correlation regarding the noise signal.

By the aforementioned circuit arrangement, an interframe difference processing can be implemented under an in-phase color signal condition without making a Y/C separation as in the prior art. It is thus possible to avoid a possible reduction in noise-elimination capability resulting from the Y/C separation.

In the aforementioned embodiment, the interframe difference processing is performed for the elimination of a noise signal contained in a high-frequency component, but the noise-reduction apparatus of the present invention involves no reduction in its noise-reduction capability, the reason of which will be explained below.

FIG. 3 shows a time/space frequency characteristic relative to a human sense of vision. As will be evident from FIG. 3, the sensitivity of human eyesight to the time frequency is low for a high spatial frequency. That is, human eyesight is dull in regard to a motion of a fine image on the viewing screen which reflects the high frequency component of a video signal, but is very sensitive to that portion which reflects the low frequency of the video signal. As in the embodiment of the present invention, it is possible to obtain the noise elimination characteristic conforming to the human vision characteristic by performing a one-frame difference processing (a one-frame motion detection) for a low frequency portion and a two-frame difference processing (a two-frame motion detection) for a high frequency portion. It is thus possible to avoid any loss in noise-reduction capability of the noise-reduction apparatus.

FIG. 5 is a schematic diagram showing a noise-reduction apparatus according to a second embodiment of the present invention. As set out above, according to the first embodiment of the present invention, an input digital video signal is separated into high- and low-frequency components so that two-frame difference processing is performed for the high-frequency component and one-frame difference processing for the low-frequency component. On the other hand, in the second embodiment of the present invention, a two-frame difference signal and a one-frame difference signal are first obtained from an input digital video signal. After that, the high-frequency and low-frequency components are extracted from the two-frame difference signal and one-frame difference signal, respectively.

In FIG. 5, a digital video signal which is delivered to an input terminal 41 is supplied via adders 42 and 52 to a one-frame delay circuit 43 where it is one-frame delayed. The one-frame delayed signal is further one-frame delayed at a one-frame delay circuit 44 in series with the one-frame delay circuit 43.

The output of the one-frame delay circuit 44 is fed to an adder 45 as a two-frame difference detector. At the adder 45, the output of the one-frame delay circuit 44 is subtracted from the digital video signal to produce a two-frame difference signal. A HPF 46 extracts a high-frequency component from the two-frame difference signal and delivers it to a ROM 47 which in turn delivers a noise-eliminating signal corresponding to the high-frequency component. The noise-eliminating signal is supplied to adder 42 where it is subtracted from the input digital video signal. Thus it is possible to eliminate a noise signal from the high-frequency component of the digital video signal.

The output of the one-frame delay circuit 43 is fed to an adder (frame difference detector) 48 where the output of the one-frame delay circuit 48 is subtracted from the digital video signal to produce a one-frame difference signal of the digital video signal. The one-frame difference signal is supplied to a LPF 49 where a low-frequency component is extracted from the one-frame difference signal. A ROM 50 delivers a noise-eliminating signal corresponding to the low-frequency component to the adder 52 where it is subtracted from the digital video signal. It is thus possible to eliminate a noise signal from the low-frequency component of the digital video signal.

The digital video signals output from the adders 42 and 52 are delivered to an output terminal 51.

The ROMs 47 and 50 are made of a non-linear circuit having an input/output characteristic as shown in FIG. 4.

As set forth above, if an interframe difference signal of a digital video signal is separated into high- and low-frequency components, it is possible to obtain the same effect as in the first embodiment of the present invention.

By using the circuit arrangement of the second embodiment of the present invention, a single one-frame delay circuit 43 may be used in place of two one-frame delay circuits 25 and 31 shown in FIG. 2 in which case it is possible to reduce the associated circuit size.

Similarly, according to the second embodiment, the three adders 24, 29 and 30 as shown in FIG. 2 can be replaced by two adders 42 and 52, the feature of which, together with the aforementioned feature, can further reduce the associated circuit size.

Further, a circuit arrangement in which the adder 42 is arranged after the adder 52 is possible to obtain the same effect as in the embodiment of FIG. 5.

As set out above, according to the present invention, since no conventional Y/C separation is effected in the interframe difference processing, it is thus possible to avoid a possible reduction in the noise-reduction capability as caused in the Y/C separation.

The use of the aforementioned circuit arrangement ensures a more complete noise reduction.

Although the noise-reduction apparatus of the present invention has been explained in conjunction with two embodiments, the present invention is not restricted to the two aforementioned embodiments and a change or a modification of the present invention may be made without departing from the spirit and scope of the present invention.

What is claimed is:

1. A noise-reduction apparatus for reducing noise in a digital video signal having a high-frequency component and a low-frequency component, the apparatus comprising:
high-frequency component extracting means for receiving the digital video signal and for extracting the high-frequency component thereof;
two-frame difference detecting means for receiving the high-frequency component extracted by said high-frequency component extracting means and for detecting a two-frame difference signal representing a difference between a signal and a two-frame delayed signal;

first elimination signal generating means, for generating a first elimination signal corresponding to the two-frame difference signal detected by said two-frame difference detecting means;

low-frequency component extracting means for receiving the digital video signal and for extracting the low-frequency component thereof;

frame difference detecting means for receiving the low-frequency component extracted by the low-frequency component extracting means and for detecting a frame difference signal representing a difference between a signal and a one-frame delayed signal;

second elimination signal generating means, for generating a second elimination signal corresponding to the frame difference signal detected by said frame difference detecting means; and noise eliminating means for eliminating the noise from the digital video signal in accordance with the first elimination signal generated by said first elimination signal generating means and the second elimination signal generated by said second elimination signal generating means.

2. The noise-reduction apparatus according to claim 1, further including two-frame delay means for delaying the high-frequency component by two frames, whereby said two-frame difference detecting means subtracts from the high-frequency component a two-frame delayed high-frequency component which is delayed by said two-frame delay means for detecting the two-frame difference signal.

3. The noise-reduction apparatus according to claim 1, further including one-frame delay means for delaying the low-frequency component by one frame, whereby said frame difference detecting means subtracts from the low-frequency component a one-frame delayed low-frequency component which is delayed by said one-frame delay means for detecting the one-frame difference signal.

4. The noise-reduction apparatus according to claim 1, wherein said noise eliminating means includes means for subtracting from the high-frequency component the first elimination signal generated by said fist elimination signal generating means and for outputting a first subtraction signal.

5. The noise-reduction apparatus according to claim 1, wherein said noise eliminating means includes means for subtracting from the low-frequency component the second elimination signal generated by said second elimination signal generating means and for outputting a second subtraction signal.

6. The noise-reduction apparatus according to claim 1, wherein said noise eliminating means further includes means for subtracting from the high-frequency component the first elimination signal and for generating a first subtraction signal, means for subtracting from the low-frequency component the second elimination signal and for generating a second subtraction signal, and means for additively combining the first and second subtraction signals.

7. A noise-reduction apparatus for reducing noise in a digital video signal having a high-frequency component and a low-frequency component, the apparatus comprising:

two-frame difference detecting means for receiving the digital video signal and for detecting a two-frame difference signal representing a difference between a signal and a two-frame delayed signal;

high-frequency component extracting means connected to extract a high-frequency component of the two-frame difference signal detected by said two-frame difference detecting means;

first elimination signal generating means, for generating a first elimination signal corresponding to the high-frequency component extracted by said high-frequency component extracting means;

frame difference detecting means for receiving the digital video signal and for detecting a frame difference signal representing a difference between a signal and a one-frame delayed signal;

low-frequency component extracting means for extracting a low-frequency component of the frame difference signal detected by said frame difference detecting means;

second elimination signal generating means, for generating a second elimination signal corresponding to the low-frequency component extracted by said low-frequency component extracting means; and noise eliminating means for eliminating the noise from the digital video signal, in accordance with the first elimination signal generated by the first elimination signal generating means and the second elimination signal generated by the second elimination signal generating means.

8. The noise-reduction apparatus according to claim 7, further including two-frame delay means for delaying said digital video signal, whereby said two-frame difference detecting means subtracts from the digital video signal a two-frame delayed digital video signal which is delayed by said two-frame delay means for detecting the two-frame difference signal.

9. The noise-reduction apparatus according to claim 7, further including one-frame delay means for delaying the digital video signal by one frame, whereby said frame difference detecting means subtracts from the digital video signal a one-frame delayed digital video signal which is delayed by said one-frame delay means for detecting the frame difference signal.

10. The noise-reduction apparatus according to claim 7, further including two-frame delay means for delaying the digital video signal by two frames, and one-frame delay means for delaying the digital video signal by one frame.

11. The noise-reduction apparatus according to claim 7, wherein said noise eliminating means includes first subtracting means for subtracting from the digital video signal the first elimination signal generated by said first elimination signal generating means, and second subtracting means for subtracting from the digital video signal the second elimination signal generated by said second elimination signal generating means.

12. A noise-reduction apparatus for reducing noise in a digital video signal before being input to a Y/C separation circuit, the noise-reduction apparatus comprising:

first means, responsive to the digital video signal, for generating a first noise-reducing signal for correcting a high-frequency portion of said digital video signal, said first means comprising:
means for extracting said high-frequency portion from said digital video signal,
means for generating a two-frame difference signal representing a difference between said high-frequency portion and an externally-generated two-frame delayed high-frequency portion of a corresponding noise-reduced digital video signal, and
means for generating said first noise-reducing signal in response to said high-frequency portion and said two-frame difference signal;
second means, responsive to the digital video signal, for generating a second noise-reducing signal for correcting a low-frequency portion of said digital video signal, said second means comprising:
means for extracting said low-frequency portion from said digital video signal,
means for detecting a single-frame difference signal representing a difference between said low-frequency portion and an externally-generated single-frame delayed low-frequency portion of a corresponding noise-reduced digital video signal, and
means for generating said second noise-reducing signal in response to said low-frequency portion and said single-frame difference signal; and
means for generating a noise-reduced digital video signal, responsive to said first and second noise-reducing signals, for being input to said Y/C separation circuit.

13. A noise-reduction apparatus recited in claim 12, wherein said means for generating a noise-reduced digital video signal comprises:
means for generating a high-frequency portion of said noise-reduced digital video signal in response to said high-frequency portion of said digital video signal and said first noise-reducing signal;
means for generating a low-frequency portion of said noise-reduced digital video signal in response to said low-frequency portion of said digital video signal and said second noise-reducing signal; and
means for generating said noise-reduced digital video signal in response to said low and high-frequency portions of said noise-reduced digital video signal.

14. A noise-reduction apparatus as recited in claim 13, further comprising:
means for delaying by two frames said high-frequency portion of said noise-reduced digital video signal and outputting said externally-generated two-frame delayed high-frequency portion of said corresponding noise-reduced digital video signal; and means for delaying by a single frame said low-frequency portion of said noise-reduced digital video signal and outputting said externally-generated single-frame delayed low-frequency portion of said corresponding noise-reduced digital video signal.

15. A noise-reduction apparatus for reducing noise in a digital video signal before being input to a Y/C separation circuit, the noise-reduction apparatus comprising:
first means, responsive to the digital video signal, for generating a first noise-reducing signal for correcting a high-frequency portion of said digital video signal, said first means comprising:
means for detecting a two-frame difference signal representing a difference between said digital video signal and an externally-generated two-frame delayed noise-reduced digital video signal,
means for extracting a high-frequency portion from said two-frame difference signal, and
means for generating said first noise-reducing signal in response to said high-frequency portion of said two-frame difference signal;
second means, responsive to the digital video signal, for generating a second noise-reducing signal for correcting a low-frequency portion of said digital video signal, said second means comprising:
means for detecting a single-frame difference signal representing a difference between said digital video signal and an externally-generated single-frame delayed noise-reduced digital video signal,
means for extracting a low-frequency portion from said single-frame difference signal, and
means for generating said second noise-reducing signal in response to said low-frequency portion of said single-frame difference signal; and
means for generating a noise-reduced digital video signal, responsive to said first and second noise-reducing signals, for being input to said Y/C separation circuit, said means for generating a noise-reduced digital video signal correcting said digital video signal in accordance with said first and second noise-reducing signals.

16. A noise-reduction apparatus as recited in claim 15, further comprising:
means for delaying said noise-reduced digital video signal and outputting said externally-generated single-frame delayed noise-reduced digital video signal; and
means for delaying said externally-generated single-frame delayed noise-reduced digital video signal and outputting said externally-generated two-frame delayed noise-reduced digital video signal.

* * * * *